United States Patent
Dai et al.

(10) Patent No.: US 11,629,083 B2
(45) Date of Patent: Apr. 18, 2023

(54) ORGANIC COMPOSITE POWDER CARRIER AND APPLICATION THEREOF IN ENHANCED BIOLOGICAL DENITRIFICATION OF MUNICIPAL WASTEWATER TREATMENT

(71) Applicants: Tongji University, Shanghai (CN); Hunan Sanyou Environmental Technology Co., LTD, Changsha (CN)

(72) Inventors: Xiaohu Dai, Shanghai (CN); Xiaoli Chai, Shanghai (CN); Bin Lu, Shanghai (CN); Dan Hou, Changsha (CN); Hongbo Han, Changsha (CN); Yue Mou, Changsha (CN); Jing Yi, Changsha (CN)

(73) Assignees: TONGJI UNIVERSITY, Shanghai (CN); HUNAN SANYOU ENVIRONMENTAL TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 16/991,063

(22) Filed: Aug. 12, 2020

(65) Prior Publication Data
US 2021/0130210 A1 May 6, 2021

(30) Foreign Application Priority Data
Oct. 31, 2019 (CN) .......................... 201911053049.2

(51) Int. Cl.
C02F 3/34 (2023.01)
B82Y 30/00 (2011.01)
C02F 3/00 (2023.01)
C02F 101/16 (2006.01)

(52) U.S. Cl.
CPC .............. *C02F 3/348* (2013.01); *B82Y 30/00* (2013.01); *C02F 2003/001* (2013.01); *C02F 2101/16* (2013.01); *C02F 2209/40* (2013.01); *C02F 2303/04* (2013.01)

(58) Field of Classification Search
CPC .............. C02F 3/348; C02F 2003/001; C02F 2101/16; C02F 2209/40; C02F 2303/04; C02F 3/2806; C02F 3/305; C02F 2305/06; C02F 3/105; B82Y 30/00; Y02W 10/10
USPC ......................................................... 210/610
See application file for complete search history.

(56) References Cited

U.S. PATENT DOCUMENTS

| | | | | |
|---|---|---|---|---|
| 3,956,129 A | * | 5/1976 | Jeris | C02F 3/2806 210/189 |
| 5,578,213 A | * | 11/1996 | Miller | B01D 21/0039 210/641 |
| 2004/0029253 A1 | * | 2/2004 | Silfversparre | C12N 1/20 435/252.3 |
| 2015/0175456 A1 | * | 6/2015 | Chen | C02F 3/28 210/610 |
| 2017/0245494 A1 | * | 8/2017 | Bardosh | C08J 5/18 |

FOREIGN PATENT DOCUMENTS

| CN | 100445365 C | * | 12/2008 | ............ Y02W 10/10 |
|---|---|---|---|---|
| CN | 2011-0084706 | * | 1/2010 | ............ C02F 3/108 |
| CN | 103011398 A | | 4/2013 | |
| CN | 105670803 A | * | 6/2016 | ............... C11C 3/04 |
| CN | 107324505 A | * | 11/2017 | ............... C02F 3/34 |
| CN | 108439615 A | * | 8/2018 | ............... C02F 3/34 |
| CN | 108503038 A | * | 9/2018 | ............... C02F 3/34 |

OTHER PUBLICATIONS

Wang, CN103011398B, Method for removing nitrate nitrogen in water by using blended material including PHBV (Polyhydroxylbutyrate Valerate) and bamboo powder (Year: 2013).*
Otto, Why is the nanoscale special (or not)? Fundamental properties and how it relates to the design of nano-enabled drug delivery systems (Year: 2013).*
Webster Dictionary: https://www.merriam-webster.com/dictionary/ultrafine (Year: 2021).*
Maria Teresa Gutierrez-Wing, Evaluation of polyhydroxybutyrate as a carbon source for recirculating aquaculture water denitrification (Year: 2011).*
Translation of Cang (CN 100445365) (Year: 2008).*
Accumulation_definition_NPL.pdf (Year: 2022).*
Adsorption_-_Definition_Applications_Types_of_Adsorption_Isotherm.pdf (Year: 2022).*

* cited by examiner

*Primary Examiner* — Nam X Nguyen
*Assistant Examiner* — Ekandra S. Miller-Cruz
(74) *Attorney, Agent, or Firm* — Bayramoglu Law Offices LLC

(57) ABSTRACT

The present invention relates to microbial carriers for wastewater treatment, and in particular, relates to an organic composite powder carrier and its application for strengthening biological denitrification in municipal wastewater treatment. The organic composite powder carrier is compounded by a microbial carrier with a relatively large equivalent particle size and an organic alternative carbon source in the form of ultrafine powder. The composite powder carrier in the present invention includes a dedicated organic alternative carbon source, such as polyhydroxyalkanoates (PHA). The organic alternative carbon source can exclude the competitive relationship between microorganisms to ensure that denitrifying bacteria exclusively obtain electron donors required for denitrification. The composite powder carrier strengthens biological denitrification in municipal wastewater treatment, significantly improves denitrification efficiency, realizes deep biological purification of wastewater and ensures that the subject effluent complies with the strictest domestic discharge standards.

9 Claims, No Drawings

ORGANIC COMPOSITE POWDER CARRIER AND APPLICATION THEREOF IN ENHANCED BIOLOGICAL DENITRIFICATION OF MUNICIPAL WASTEWATER TREATMENT

CROSS REFERENCE TO THE RELATED APPLICATION

This application is based upon and claims priority to Chinese Patent Application No. 201911053049.2, filed on Oct. 31, 2019, the entire contents of which are incorporated herein by reference.

TECHNICAL FIELD

The present invention relates to microbial carriers for municipal wastewater treatment, and more particularly, relates to an organic composite powder carrier and its application in enhanced biological denitrification of municipal wastewater treatment.

BACKGROUND

China has advanced stricter requirements for municipal wastewater treatment, especially for biochemical oxygen demand (BOD) and other indicators. Due to the lack of carbon source in the influent, wastewater treatment plants usually add carbon source to the anoxic section of the wastewater treatment pool to provide electron donors. This results in denitrifying microorganisms to strengthen biological denitrification and make the total nitrogen index of the effluent comply with standards. The addition of carbon source, however, increases the cost of wastewater treatment. Carbon source is also a high-quality microbial nutrition source. This presents a problem because denitrifying bacteria compete with common biological bacteria that degrade chemical oxygen demand (COD) for a source of nutrients. When carbon source is added, it therefore tends to have a negative impact on denitrification efficiency. The addition of carbon source sometimes results in an overall net gain in waste as denitrifying bacteria have not formed competitive bacteria.

SUMMARY

In view of the above technical problems, the present invention provides an organic composite powder carrier, which is compounded by a microbial carrier with a comparatively large equivalent particle size and an organic alternative carbon source in the form of ultrafine powder.

Preferably, the particle size of the microbial carrier is on the order of approximately 10 microns, and the equivalent particle size of the organic alternative carbon source is on a nanoscopic scale.

Preferably, the organic carbon source is ultrafine powder of short-chain polyhydroxyalkanoates (PHA). PHA, as a selective carbon source, is easily utilized by denitrifying microorganisms to improve nitrate reductase activity and facilitate electron transfer efficiency.

The present invention also provides an application of the organic composite powder carrier in municipal wastewater treatment to strengthen biological denitrification. The organic composite powder carrier is controlled and transmitted to the wastewater through the feeder.

Preferably, the concentration of the organic composite powder carrier constantly fed into the wastewater treatment biochemical pool is 20-50 mg/L, which can increase the concentration of the mixed solution in the biochemical pool to 10-20 g/L.

Preferably, the organic composite powder carrier is stirred after being put into the wastewater treatment biochemical pool.

Preferably, after the addition of the organic composite powder carrier in wastewater, the organic alternative carbon source is tightly adsorbed on the microbial carrier.

According to the above technical schemes, the present invention employs a composite powder carrier containing a dedicated organic alternative carbon source. This organic alternative carbon source, as a specific and selective carbon source, ensures that denitrifying bacteria exclusively acquire the electron donors for denitrification by excluding the competitive relationship between denitrifying bacteria and common microorganisms. Furthermore, the organic alternative carbon source improves nitrate reductase activity and facilitates electron transfer efficiency. It also enhances biological denitrification in municipal wastewater treatment, significantly improving denitrification efficiency, and ensuring that the effluent meets stricter discharge standards.

DETAILED DESCRIPTION OF THE EMBODIMENTS

The present invention is described hereinafter in detail. The exemplary embodiments and illustrations of the present invention herein are used to explain the present invention, but are not intended to limit the present invention.

The present invention provides an organic composite powder carrier. The carrier is compounded by a microbial carrier with a relatively large equivalent particle size and an organic alternative carbon source in the form of ultrafine powder. The microbial carrier is diatomite, attapulgite, perlite or powdered zeolite, The organic alternative carbon source, as a specific and selective carbon source, can eliminate the competitive relationship between denitrifying bacteria and common microorganisms, improve nitrate reductase activity and electron transfer efficiency, facilitate denitrifying bacteria exclusively obtaining the electron donors required for denitrification, and thus improve the biological denitrification capacity of the organic composite powder carrier. Preferably, the particle size of the microbial carrier is on the order of approximately 10 microns, and the equivalent particle size of the organic alternative carbon source is on a nanoscopic scale. As a consequence, the nano-scale organic alternative carbon source is adsorbed tightly on the microbial carrier in advance by utilizing the relatively large surface energy of the microbial carrier with comparatively large equivalent particle size combined with dry powder mixing, thus enhancing the ability of the organic composite powder carrier to enhanced denitrification in sewage treatment.

The present invention also provides an application of an organic composite powder carrier in municipal wastewater treatment for enhanced biological denitrification. The organic composite powder carrier is transported into the wastewater by a feeder, so as to accurately control the input amount of the organic composite powder carrier. The organic composite powder carrier of the present invention is preferably put into the wastewater at a concentration of 20-50 mg/L, which can effectively improve the concentration of the mixed solution in the wastewater treatment biochemical pool to reach 10-20 g/L. It can achieve optimal effect of degrading COD and strengthening biological denitrification, thus ensuring that the effluent meets the stricter domestic discharge standards.

in the implementation, the surface energy (e.g. van der Waals attraction, electrostatic attraction of functional groups on the surface of particles, etc.) of the microbial carrier is relatively large, and the microbial carrier pre-adsorbs the ultrafine powder particles of the organic alternative carbon source. After the composite powder carrier of the present invention is put into the wastewater treatment biochemical pool, the ultrafine powder particles of the alternative carbon source are difficult to overcome the surface energy of the microbial carrier and escape. This ensures that the microbial carrier is closely adsorbed with the ultrafine powder particles of the organic alternative carbon source, thus giving full play to the role of the composite powder carrier and improving the wastewater treatment capacity of the biochemical pool with the organic composite powder carrier. Preferably, stirring is needed after the organic composite powder carrier is added to the biochemical pool, which is conducive to adsorbing growth microorganisms and forming bacterial micelles by bio-flocculation. The stirring speed is optimally 1.5-2.5 m/s equal to the linear speed of the outer edge of the impeller of the stirring equipment, which prevents the sedimentation of the composite powder carrier, gives full play to the role of the composite powder carrier, improves the wastewater treatment capacity of the biochemical pool with the organic composite powder carrier, and ensures that the effluent complies with the stricter environmental standards. After the organic composite powder carrier is added to wastewater, the organic alternative carbon source adheres to the microbial carrier and is utilized by the attached denitrifying bacteria as an electron donor to promote a denitrification reaction.

Unlike traditional carbon sources, PHA added in the present invention is difficult for common biological bacteria to degrade or utilize as a nutrient source, but it can be utilized by denitrifying bacteria as an electron donor for denitrification. Therefore, the PHA ultrafine powder is tightly adsorbed on the microbial carrier by dry mechanical grinding to form a composite powder carrier in the present invention due to the huge particle size difference and surface adsorption energy between the microbial carrier particles and the equivalent particle size of the PHA ultrafine powder. When this composite powder carrier is added to the wastewater treatment biological reaction pool, denitrifying bacteria need to attach to the microbial carrier due to the growth characteristics, even attach to the adsorbed PHA surface. Therefore, this artificially constructed environment suitable for denitrification bacteria growth must be conducive to promoting the continuous denitrification reaction under the condition that the anoxic section of the biochemical pool contains nitrate.

In summary, the composite powder carrier not only provides a carrier suitable for the attachment and growth of microorganisms, which increases the concentration of mixed solution in the biochemical pool, but the carrier also makes denitrifying bacteria a dominant species. At the same time, the composite powder carrier provides an organic alternative carbon source PHA that can promote denitrification for denitrifying bacteria that prefer attachment growth. In this invention, PHA is adsorbed on the carrier and difficult to degrade or be utilized by common biological bacteria, but it can be used as an electron donor for denitrification reaction. PHA is conducive to the continuous denitrification reaction, especially in the treatment of municipal wastewater with low carbon-nitrogen ratio to make the total nitrogen index of effluent water meet the stricter environmental standards.

The implementations above are only for the purpose of illustrating the present invention, and are not intended to limit the present invention. Those ordinary skilled in the relevant art may make various changes and modifications, without departing from the spirit and scope of the present invention. Therefore, all equivalent technical solutions should also belong to the scope of the present invention.

What is claimed is:

1. A method of use for enhancing denitrification of wastewater treatment in a biological nitrogen removal unit by applying an organic composite powder carrier comprising:
   controlling an input amount of the organic composite powder carrier and transmitting the organic composite powder carrier to a wastewater treatment biochemical pool through a feeder,
   wherein the organic composite powder carrier comprises a microbial carrier with a particle size of approximately 10 microns and an organic alternative carbon source,
   wherein the organic alternative carbon source is a short-chain polyhydroxyalkanoate ultrafine powder on a nanoscopic scale and is adsorbed on the microbial carrier based on surface energy of the microbial carrier caused by the particle size of the microbial carrier being larger than the particle size of the organic alternative carbon source,
   wherein the organic alternative carbon source is tightly adsorbed on the microbial carrier in advance of being transmitted to the wastewater treatment biochemical pool; and
   promoting a denitrification reaction by denitrifying bacteria after transmitting the organic composite powder carrier to the wastewater treatment biochemical pool.

2. The method according to claim 1, wherein the organic alternative carbon source improves the denitrificiation capacity of the organic composite powder carrier by offering electron donors required for removal and optimizing distribution of a microbial community through inducing denitrifying.

3. The method according to claim 1, wherein transmitting the organic composite powder carrier to the wastewater treatment biochemical pool, further comprises transmitting the organic composite powder carrier as a solution in a concentration of 20-50 mg/L.

4. The method according to claim 1, further comprising stirring the organic composite powder carrier after transmitting to the wastewater treatment biochemical pool.

5. The method according to claim 3, further comprising stirring the organic composite powder carrier after transmitting to the wastewater treatment biochemical pool.

6. The method according to claim 1, wherein the microbial carrier is selected from either attapulgite or perlite.

7. The method according to claim 1, further comprising attaching the denitrifying bacteria to the organic alternative carbon source.

8. The method according to claim 1, wherein the organic composite powder carrier consists of the microbial carrier and the organic alternative carbon source.

9. The method according to claim 1, further comprising attaching the denitrifying bacteria to the microbial carrier, after transmitting the composite powder carrier to the wastewater treatment biological reaction pool, thereby promoting the denitrification reaction.

* * * * *